(12) United States Patent
Sanders

(10) Patent No.: US 11,551,320 B1
(45) Date of Patent: Jan. 10, 2023

(54) SYSTEM AND METHOD FOR SECURELY DELIVERING LEGAL SERVICE

(71) Applicant: Cassius Sanders, Lawndale, CA (US)

(72) Inventor: Cassius Sanders, Lawndale, CA (US)

( * ) Notice: Subject to any disclaimer, the term of this patent is extended or adjusted under 35 U.S.C. 154(b) by 0 days.

(21) Appl. No.: 17/728,916

(22) Filed: Apr. 25, 2022

Related U.S. Application Data

(60) Provisional application No. 63/331,125, filed on Apr. 14, 2022.

(51) Int. Cl.
  *G06Q 50/18* (2012.01)
  *H04L 65/1069* (2022.01)

(52) U.S. Cl.
  CPC .......... *G06Q 50/18* (2013.01); *H04L 65/1069* (2013.01)

(58) Field of Classification Search
  CPC .............................. G06Q 50/18; H04L 65/1069
  See application file for complete search history.

(56) References Cited

U.S. PATENT DOCUMENTS

| | | | |
|---|---|---|---|
| 2002/0002469 A1* | 1/2002 | Hillstrom | G06Q 10/10 707/999.107 |
| 2007/0112616 A1* | 5/2007 | Shubov | G06Q 10/04 705/7.25 |

* cited by examiner

*Primary Examiner* — Sam Bhattacharya

(57) ABSTRACT

Disclosed herein is a system for an on-demand connection of a client with a legal professional. The system receives a request to connect a client with a legal professional for a particular legal event. The system also determines a type of type of legal professional corresponding to the legal event and select a legal professional capable of handling the particular legal event. The legal professional is selected amongst multiple candidate legal professionals. The system also establishes a real-time two-way communication between the client and the selected legal professional where the client has not having previously communicated with the selected legal professional.

16 Claims, 10 Drawing Sheets

SYSTEM AND METHOD FOR SECURELY DELIVERING LEGAL SERVICE

RELATED APPLICATIONS

This application claims priority to and the benefit of U.S. Provisional Patent Application No. 63/331,125, filed on Apr. 14, 2022, the contents of which are hereby incorporated by reference herein for all purposes.

TECHNICAL FIELD

This disclosure is generally to assistance systems, and more particularly to a system and method for securely delivering legal services in real time.

BACKGROUND

In a variety of settings, individuals find themselves in situations where a lawyer and/or legal advice are needed, but is otherwise unavailable. Non-limiting examples include being pulled over or stopped by a police officer, being involved in an altercation, handling a transaction, being asked to sign a document, and/or being involved in an altercation, amongst many others. In short, such individuals may not have an appropriate understanding as to legal rights involved in the situation. And, legal advice is not readily available—especially when the individuals may not have had previously used a lawyer or know who to contact.

SUMMARY

Disclosed herein is a system for an on-demand connection of a client with a legal professional. The system receives a request to connect a client with a legal professional for a particular legal event. The system also determines a type of type of legal professional corresponding to the legal event and select a legal professional capable of handling the particular legal event. The legal professional is selected amongst multiple candidate legal professionals. The system also establishes a real-time two-way communication between the client and the selected legal professional where the client has not having previously communicated with the selected legal professional.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1A:
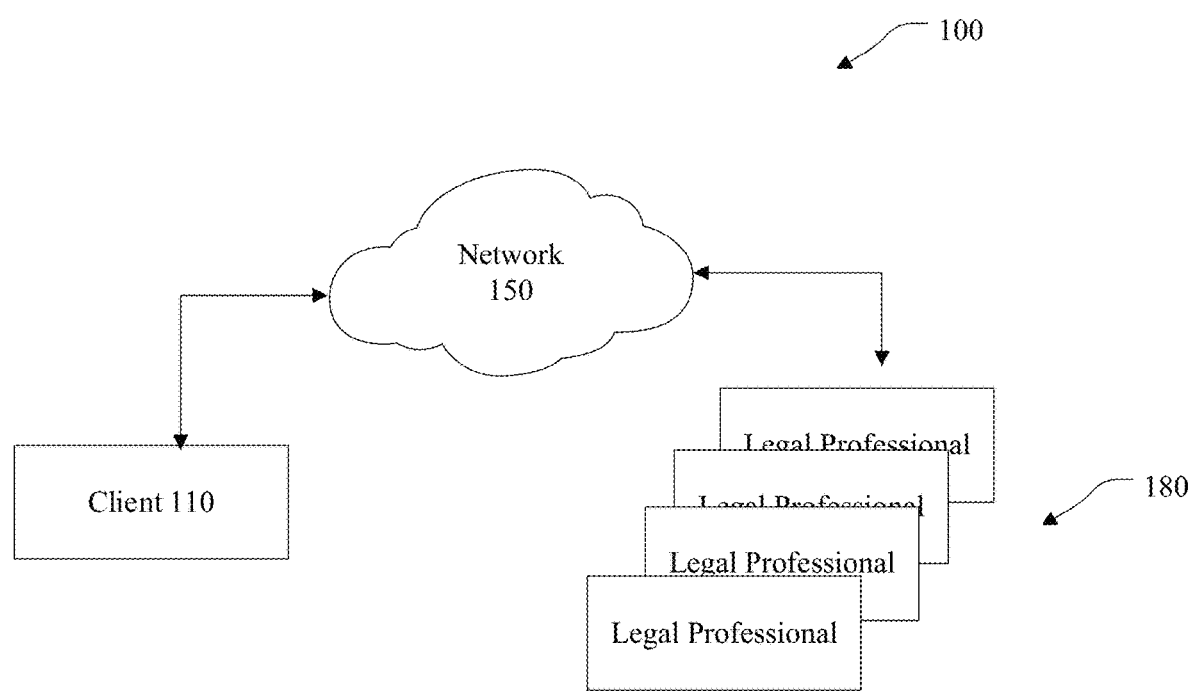
FIG. 1A illustrates a high-level schematic of a legal services assistance system 100a, according to an embodiment of the disclosure.

The FIGURES described below, and the various embodiments used to describe the principles of the present disclosure in this application are by way of illustration only and should not be construed in any way to limit the scope of the disclosure. Those skilled in the art will understand that the principles of the present disclosure invention may be implemented in any type of suitably arranged device or system. Additionally, the drawings are not necessarily drawn to scale.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments.

Additionally, it should be understood that while certain advantages may be described with reference to certain embodiments, other embodiments may have some or none of such advantages.

As described above, a system is accessible to a client and a legal professional to allow remote communication between the two. Using such a system, the client may be allowed on-demand access to the legal professional—even in situations where the client had not previously engaged the lawyer. Rather, for example, the client may have signed up for a service on the system that allows for access to the lawyer on demand should a need arise.

As a non-limiting example use of the system, a client and a lawyer can both access a website, an application, or a platform that is installed on a client device and a lawyer device, respectively. Both the client and the lawyer may sign up and log in by entering a username and password or another suitable authentication. There may be a range of input options available on the client device to provide insight into the situation in which legal counsel is needed. Non-limited example include, but are not limited to being pulled over by a police officer, begin stopped or retained by a police officer, being involved in a traffic accident, being asked to sign a document, being involved with an altercation. While not specifically called out, one of ordinary skill in the art will recognize a variety of other situations in which legal advice is need. In particular configurations, a degree of urgency may be involved with the particular type of situation and handled by the system, accordingly. As a non-limiting example, a traffic stop may be considered more urgent than a situation where one is asked to sign a document that does not otherwise immediately need to be signed.

Continuing with the example, a user may be pulled over by a police officer may access the system through, for example, an application located on a smart phone. The app may use the camera/microphone features from the smart phone to start recording and/or streaming information about the situation. In certain configurations, the video feed from the camera/microphone may be stored for later access—including access minutes later by a lawyer contacted. When referencing such cameras, this disclosure may utilize one or both of a smart camera's "front" and "back" cameras from each side of the camera.

Based on the user's present location and the type of situation (which may involve user input and/or assessed information from the microphone/camera), the system may search for available attorneys/lawyers.

In particular configurations, the user and/or the system may choose to limit the search to lawyers in a specific geographic area, such as close to their house or workplace or lawyers with particular expertise. In particular configurations, preferences may be provided by a user beforehand during sign-up with a service associated with the system.

Continuing with the example, simultaneous with contacting the lawyer or when a lawyer responds, the information about the situation may be forwarded to specified emergency contacts associated with a user's profile. Those emergency contacts may be given the location of the client as well as access to the live video feed obtained from the camera/microphone of the user.

The lawyer may appear on the client's device screen, provide a brief introduction, inform the client that he or she has the location and that the live video is being sent to emergency contacts. The lawyer may also be allowed to view a recording of minutes earlier before the lawyer was ultimately contacted to assess a situation beforehand. When the officer approaches the car and starts speaking, the lawyer may interrupt to inform the officer that he or she is a lawyer, disclose their bar number, and inform the officer that they are being filmed.

If the officer disregards the client's rights, the lawyer will inform the officer as appropriate that his or her client is not required to do anything he or she is asked to do.

The system itself may be invoke through any suitable method. In one configuration, the user may say a specific word (once or multiple times) to invoke the service and activate the system. Also, the client may have the option of purchasing a spy pen to keep in the pocket and use to record.

While a smart phone and corresponding "app" is described as one technique of contacting a lawyer using the system, in other configuration a car may either utilize or be retrofitted with cameras that can be stream video feeds and/or record information. As a non-limiting example, the application for may be an extension of Android Auto or Apple Carplay. More and more cars are starting to use cameras; and, car owner are starting to install streaming cameras. Embodiments of the disclosure are intended to avail from this enhancement of cars.

While capturing of information corresponding to an incident is described, in certain configurations, the system may also utilize nearby members associated with the system. As an example, if a situation is triggered in the system, in addition to triggering a lawyer, the system may also inquire whether other members in the system are located nearby and invite such members in real-time to capture additional camera/audio fees associated with the situation from a different viewpoint. Such differing viewpoints feeds may be accessible to the lawyer. In certain configurations, only certain heighted scenarios may invoke such a community involvement. And, only members within a certain determined location from the heightened scenario may be invited.

Such a community involvement feature may be particular useful for individuals who are also members that are either traveling or with the particular client associated the situation.

The above is a simplified example to provide an understanding of some embodiments of the disclosure. This summary is neither an extensive nor exhaustive overview of the present disclosure and its various embodiments. The summary presents selected concepts of the embodiments of the disclosure in a simplified form as an introduction to the more detailed description presented below. As will be appreciated, other embodiments of the disclosure are possible utilizing, alone or in combination, one or more of the features set forth above or described in detail below.

While the term "lawyer" is referenced, other types of legal professional may be utilized—either for advice or prescreening of the situation. As a non-limiting example, a client/user may not know what type of legal advice is needed and generally contact the system to interact with someone who knows what type of other legal professional (including lawyers) are suitable for the situation. Also, while types of scenarios are described herein, any scenario needing input from a legal professional may avail from this disclosure. A non-limiting examples of legal professionals includes law student at a law clinic.

FIG. 1A illustrates a high-level schematic of a legal services assistance system 100a, according to an embodiment of the disclosure. A client 110 generally seeks to communicate with a legal professional within a bank of legal professionals 180 in an expeditious and on-demand manner, for example, because of a particular legal event corresponding to the client 110. Non-limiting example of such legal events have been described herein.

A network 150 is generally as connecting the client and 110 and legal professional. While the network 150 shown as a cloud, any of a variety of computers may be included in the network 150 for expeditiously connecting a particular legal professional with the client 110.

The system 100 selects amongst available legal professionals 180. A variety of input may go into such a selection process including, but not limited to, the location of the client, the location of the legal professional, the experience of the legal professional, the licenses of the legal professional, and the like.

Where the client 110 has more one or more devices associated with them, the device can be used for the communication and/or to capture information about the legal event. One example non-limiting device is a smart phone. Others are described below. For example, a variety of type of media can be capture, including but not limited to photos, audio, and video. In certain circumstances, such media may be communicated before the communication session is established between the client and legal professional, for example, to allow the legal professional to gather additional information about the event. In particular configurations, the system may be allowed to gather information from any of the devices associated with the client—including, phone, watches, and vehicle data. Such may relay information such as an accident, crash, rapid heart rate of a client, and other measurable information for the legal event. Select information can be communicated to the legal professional, such as a speed of a vehicle.

In certain configurations, the legal professional may be allowed to communicate on behalf of client to third parties, for example, using the speaker capabilities of the client's device. As an example, "Officer, this is my client and I ask that you direct question concerning my client through me."

In particular configurations, for example, where a document has been used over and over, the system 100 may recognize similarities in the documents to other documents to assist the legal professional in providing advice for the particular legal event. As an example, where a defective ticket is known and issued, the system may recognize that other legal professional have noted that such a ticket is ineffective and provide a note to legal counsel. In such a scenario, the legal professional may announce something such as "Officer, as determined by the Court in xxxxx, this particular ticket has been determined be legally defective."

As noted herein, based on a determined location of a client and determined proximity of other clients in the system, the system 100 may invite other users to capture media for the particular event. Such collective community efforts may serve assisting another out as evidence that may later need to be used. In such scenarios, the system may specifically instruct other users what help is needed and what evidence (e.g. video evidence should be gathered).

Figure 1B:
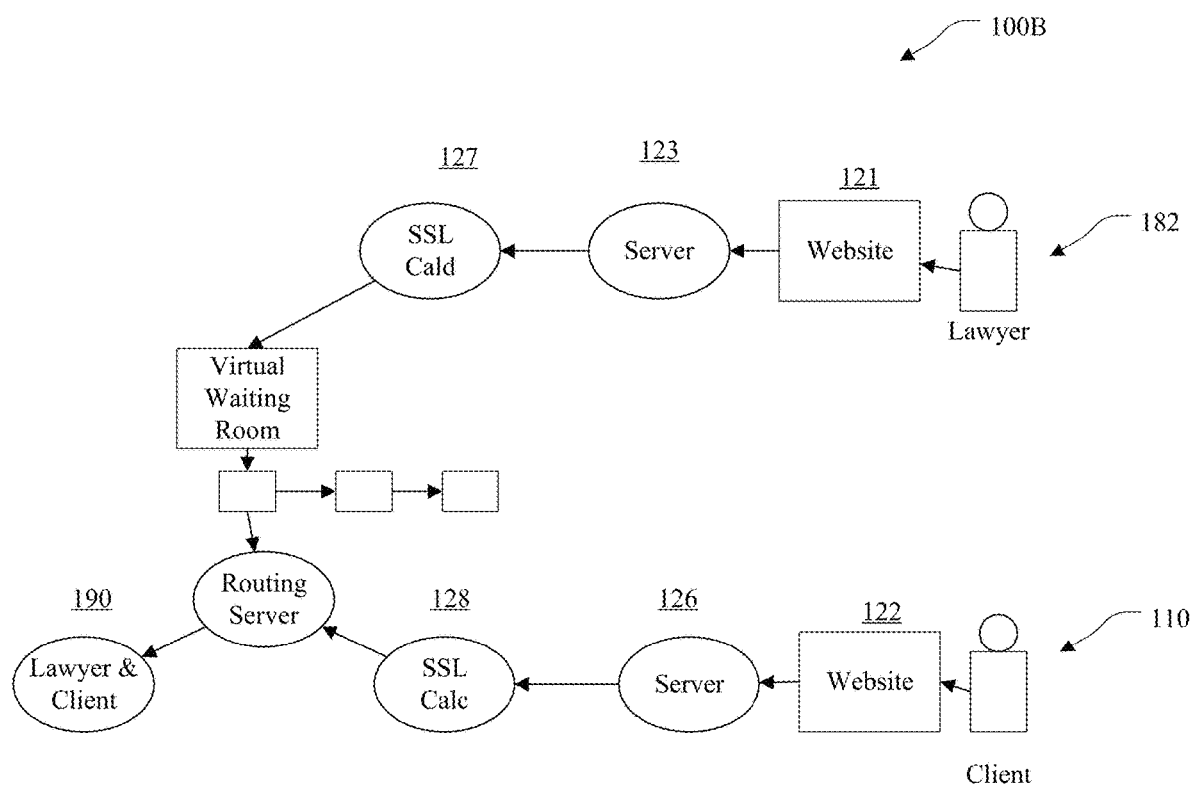
FIG. 1B illustrates a schematic representation a legal services assistance system, according to an embodiment of the disclosure.

FIG. 1B illustrates another schematic representation of a legal services assistance system 100B, according to an embodiment of the disclosure. Here, the client 110 is shown connecting with a lawyer 182. A real-time communication 190 is ultimately established. While particular details are described, other embodiments may deviate from these details.

A website, an application, or a platform (generally depicted as 121 and 122) deployed on a client device and a lawyer device, respectively, can be accessed by both the client 110 and the lawyer 182. Appropriate servers 123, 126 and security protocols 127, 128 (e.g., including, but not limited to SSL) can be associated with such a connection.

By entering a username and password or through another suitable authentication mechanism, both the client and the lawyer may sign up and log in. On the client device, there may be a variety of input possibilities to pick from, such as but not limited to, pull over, a traffic accident, a call family, or others. In particular configurations, an application for a phone may be utilized. In other configurations, other communications through a browser may be utilized such as WebRTC or other suitable communication.

In one embodiment of the disclosure, clients in the United States may be separated into regions such as the west and east coasts. Clients on the west coast can be grouped by state and send messages and communicate with one another, allowing them to be placed in the appropriate virtual waiting rooms, allowing clients from a certain region, such as California, to connect with a lawyer from the same region. Another illustrative embodiment of the present disclosure includes divisions for input options such as pulled over, traffic accident, and "call family," among others. In certain embodiments, lawyers may be waiting on standby in a virtual waiting room with a pool of other lawyers.

In certain embodiments, a lawyer may be at his or her office, at a desktop, and connected to the system, for example virtually waiting for a potential request for assistance. In other configurations, a lawyer may be on a phone, tablet, or other device remote from his or her office—also waiting for assistance. When needed, any suitable notification may prompt the lawyer for his or her attention. When not otherwise in the waiting room, in other configurations, a suitable notification may prompt a lawyer to access the system—even when not already connected. When the lawyer is otherwise unavailable, he or she may inform the system. Alternatively, the lawyer may notify the system when he or she is available to join the system. In either scenario, a toggle associated with the lawyers account may be toggled from "on-call"/"not-on-call" scenarios. As a non-limiting example, an app associated with the lawyers account can be quickly accessed from a smart phone to inform the system as to availability through example, an app designed for the lawyers.

In certain embodiments, the system can verify credentials of lawyer as being suitable for certain scenarios and/or geographic areas. Such verification process may involve any suitable vetting process to determine that a lawyer and/or other legal professional is suitable for a particular situation. Non-limiting examples include reviewing good standings with state bar licensing and reviewing particular practice areas. When on-boarding lawyers in an application process, the lawyers may be able to specify situations he or she is capable of handling. Independent reviewers can verify. Dynamic feedback may also be provided based on past experience a lawyer has had in the system for determining future use in other scenarios. As a non-limiting example, while otherwise qualified, some legal professionals may not be preferred for certain scenarios because of bad feedback.

Figure 2:
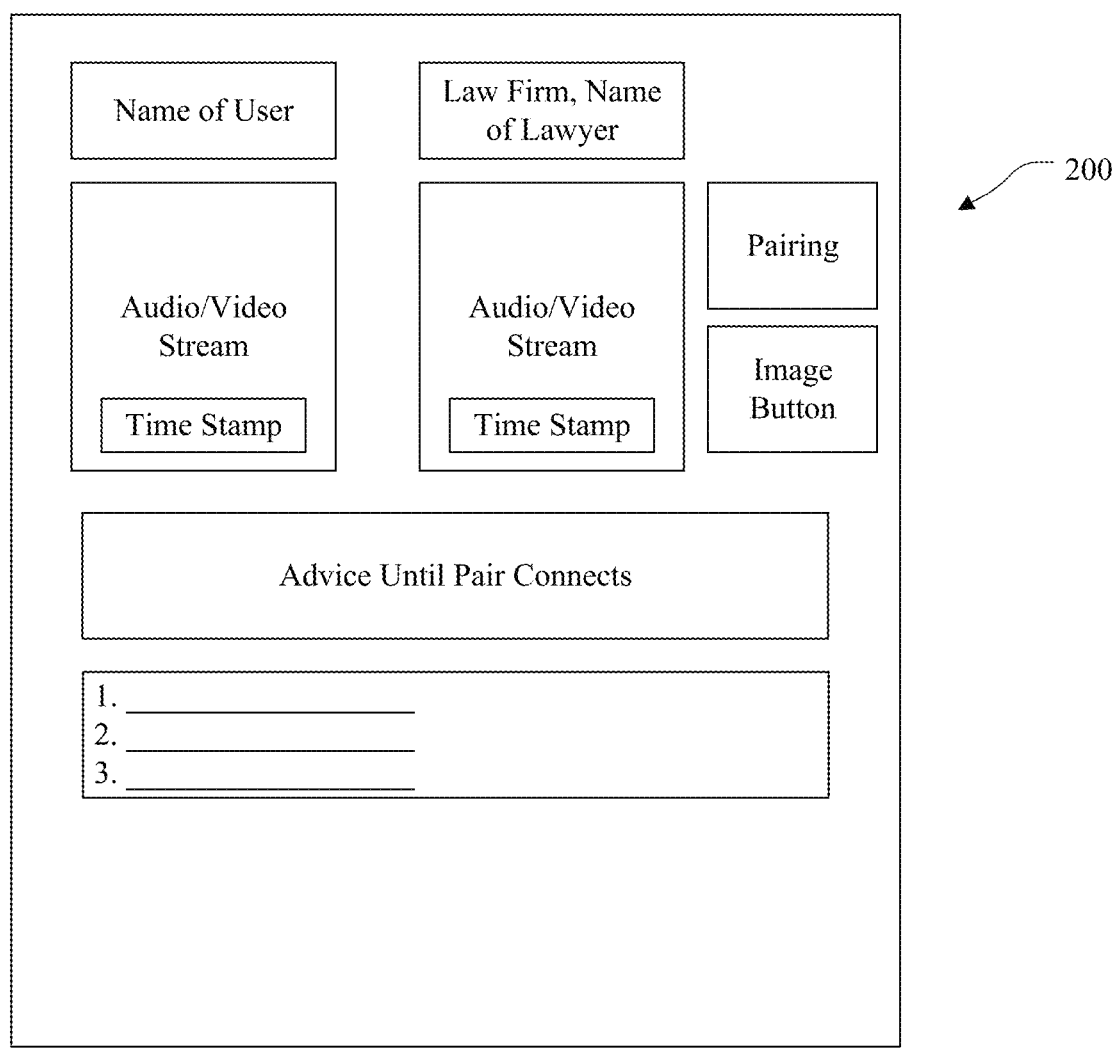
FIG. 2 illustrates a wire frame of site lawyer and user stream while pairing, according to an embodiment of the disclosure.

FIG. 2 illustrates a wire frame 200 of a site lawyer and user stream while pairing, according to an embodiment of the disclosure. Stated differently, this wireframe 200 represent a a user and lawyer attempting to contact with one another. A user's identity and a time stamp may be sent to a server in one embodiment of the disclosure. Then, a connection with a lawyer is established. In particular configurations, the lawyer may be in a pool of lawyers ready for connection. In other configurations, the lawyer may be asked to join the system because a lawyer is not otherwise available.

In particular configurations, the location (which may be obtained from the mobile device) may be sent to the system to determine a lawyer licensed in the area. Suitable information concerning the activity may also be obtained—either form the client or from information obtained from sensors associate with the smart phone (e.g., audio and/or video). As a non-limiting example, a client in certain configurations may be able to invoke the system and simply turn on the video to allow, for example, an intermediary determine the situation from the video feed and contact the right legal counsel. Again, as referenced above, if it is uncertain as to the legal advice needed, an intermediary may help determine. The intermediary may either be a live person or software intelligence that uses the location and/or other information to determine what type of legal advice that might be appropriate.

In one configuration, an alert may appear to confirm that the lawyer has successfully connected to the server and has been assigned.

The lawyer's time stamp is saved, and an audio/video call is ready to start; until the lawyer and client connect, the advice section may offer instructions. The advice section of one embodiment of may show the client guiding steps and prepare the client for engagement with a police officer when they are pulled over. Once the client and lawyer devices are connected, the advice portion may still be available for reference. As a non-limiting example, the advice section may both instruct the client what to say.

If a particular document is offered in the scenario, the client/user may use the application and camera features of the smart phone to take a picture for review by the lawyer (or legal professional) remotely. Alternatively, the document may be obtained from capturing a frame of the video feed.

Figure 3:
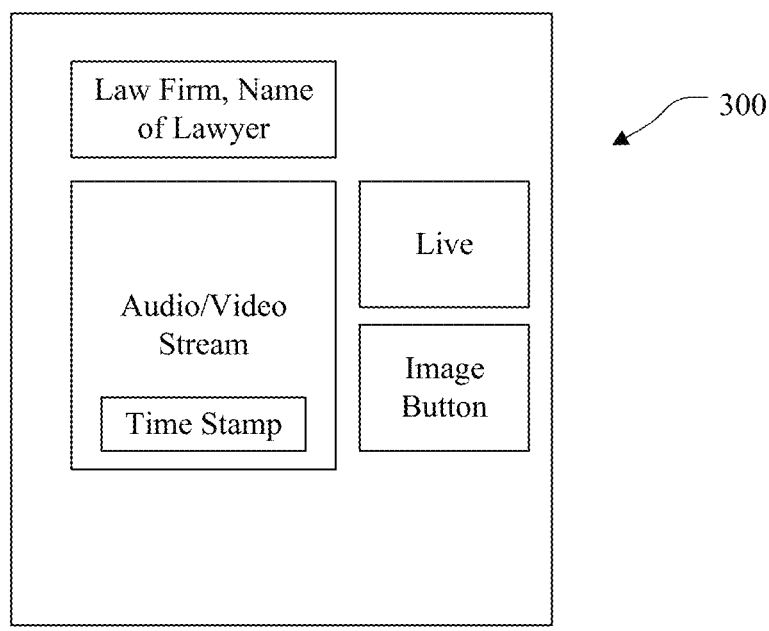
FIG. 3 illustrates a wire frame of site lawyer stream only, according to an embodiment of the disclosure.
Figure 4:
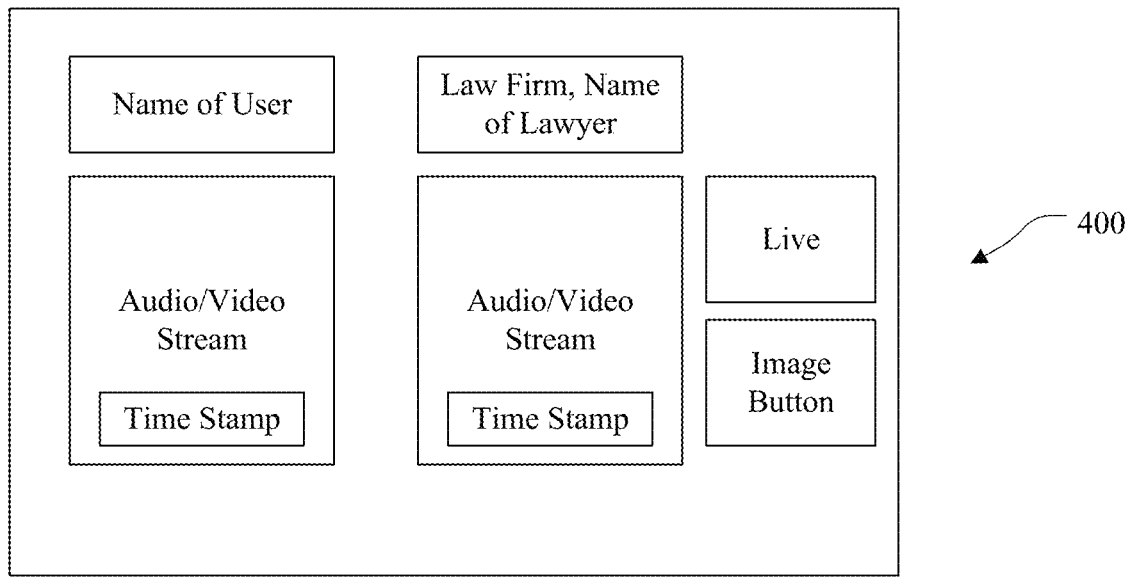
FIG. 4 illustrates a wire frame of site lawyer and user stream, according to an embodiment of the disclosure.
Figure 5:
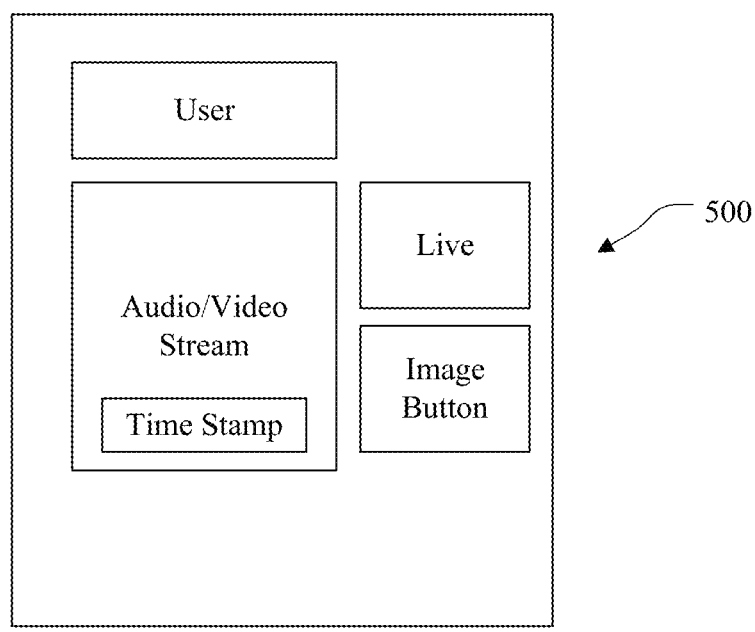
FIG. 5 illustrates a wire frame of site lawyer stream only, according to an embodiment of the disclosure.

As shown in FIGS. 3, 4 and 5, and corresponding wire frames 300, 400 and 500 the connection mode allows the client to send an audio or video stream to the lawyer of their choice, and the lawyer may connect to the client's audio or video stream. As referenced above, in addition to the live audio or video stream, recorded audio or video from minutes before the lawyer connection may be stored for assessment by the lawyer. Such information may be helpful where events occur before the client and lawyer are able to connect.

The platform available on the client's device and the lawyer's device may display "live" if the client and the lawyer are connected; otherwise, if the lawyer and the client are in idle mode, the platform may display "idle." On the client's and lawyer's devices, an image button may also be presented for taking a picture.

The legal services delivery system may be in pair mode, and the term "pairing" may appear on both the user and the lawyer's user interfaces will waiting. The user could be a client in this case. The legal services delivery system waits for the time pairs (client and lawyer) to connect with each other before establishing the connection.

As a non-limiting example, if a client is pulled over and requires quick legal assistance, a phone application may provide an option to provide input. For example, if a client is pulled over for a traffic stop, the officer may request a search of the vehicle and may order the client to perform specified tasks. The application's input may elicit some inputs, such as what the scenario is in order to identify how and who to connect the lawyer with. Certain client guides, such as touch base interfaces and screen menus, may be available to elicit the correct information.

In particular configurations, lawyers that are online may be placed in a pool with other lawyers. When a client connects and seeks assistance, they may access that pool of lawyers. In particular configurations, a goal is to bring a lawyer to a client who has been pulled over and requires assistance as quickly as feasible. In such configurations, a pool is a suitable model because the lawyers are active and ready to engage a scenario. Although the pool is used in some configurations, it may not be used in others. If, for example, an attorney who is needed is not available or is not currently logged in, the attorney may receive a push notification to return and say, "Hey, we need someone right away."

As referenced above, the present disclosure is not limited to only specific scenarios. While traffic stops are discussed, the system may be used in any situation where a person needs rapid legal aid. For example, the system can be used in arrest scenarios and request for entry into a home by police officers. Before further actions are taken, the user may want to speak with a lawyer.

Again, as referenced above, the lawyers or legal professionals may be assessed to ensure that they have the necessary credentials to speak with and/or handle a situation with a certain client. The credentials that are considered may include things like being licensed in the state, representing a certain client in the past, or being an expert in traffic stops, among other things. When a client is pulled over by the police, lawyers who are appropriate for that case may be assigned.

In an example scenario, if the client clicks the "Pulled Over" button, a message will appear to confirm that the client has established a connection with the server. The client will then be connected to a lawyer who is a member of a virtual waiting room by the server. The sign-in page will then slide up, followed by the audio and video block sliding down and revealing itself. When the system takes control, it will begin to connect the two peers. The duration of time it takes to link a lawyer and a client is determined by their physical distance, network structure, and pool of lawyers.

Figure 6:
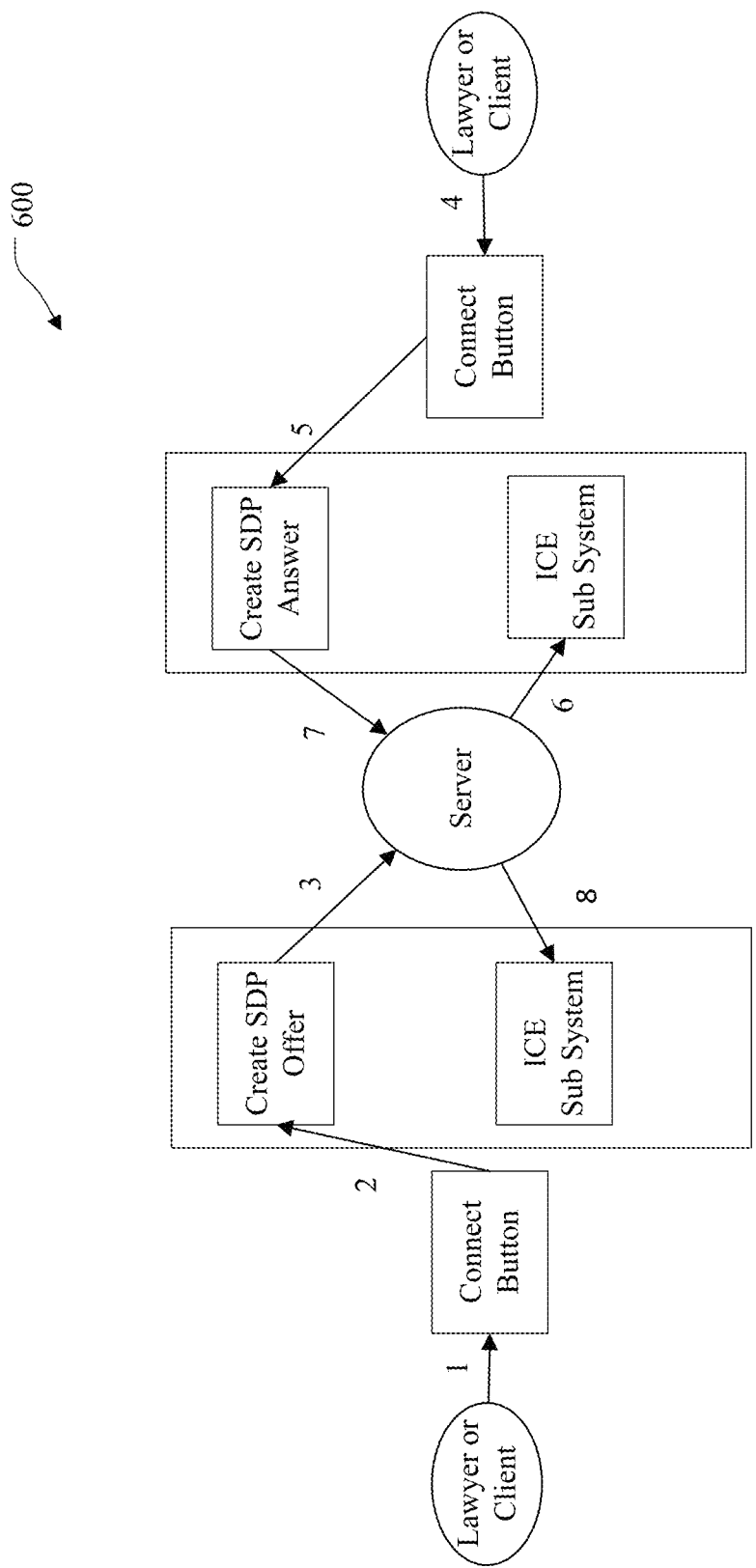
FIG. 6 illustrates a block diagram of a client and lawyer connection initiation with a server for assistance, according to an embodiment of the disclosure herein.

FIG. 6 illustrates a block diagram of a client and lawyer connection initiation with a server for assistance, according to embodiments of the present disclosure. The numbering 1 through 7 generally corresponds to an ordering of operations that may occur according to a particular embodiment. While ordering may be describes a beginning with a client, reference is made to a "lawyer or client" as either may initiate. By selecting the connect option/button, the client can establish a connection with the server and send a session description protocol (SDP) offer for real-time audio or video broadcasts. The lawyer may receive an alert and establish the connection by clicking on the connect option/button, and may also create a session description protocol (SDP) answer to a server for real-time audio or video streaming in one embodiment. The ICE subsystem then establishes the connection mode and directs the communication. In certain embodiments, the alert may be a confirmation that the lawyer is now a member of the virtual waiting room. When the network detects the connection for the first time, it may treat it as foreign and may need to update its internal DHCP table, according to one embodiment. Even if the connect test fails, the system may continue to try connecting.

While FIG. 6 demonstrates one example process, one of ordinary skill in the art (after review of this specification), will recognize other processes that may be used for connection.

Figure 7:
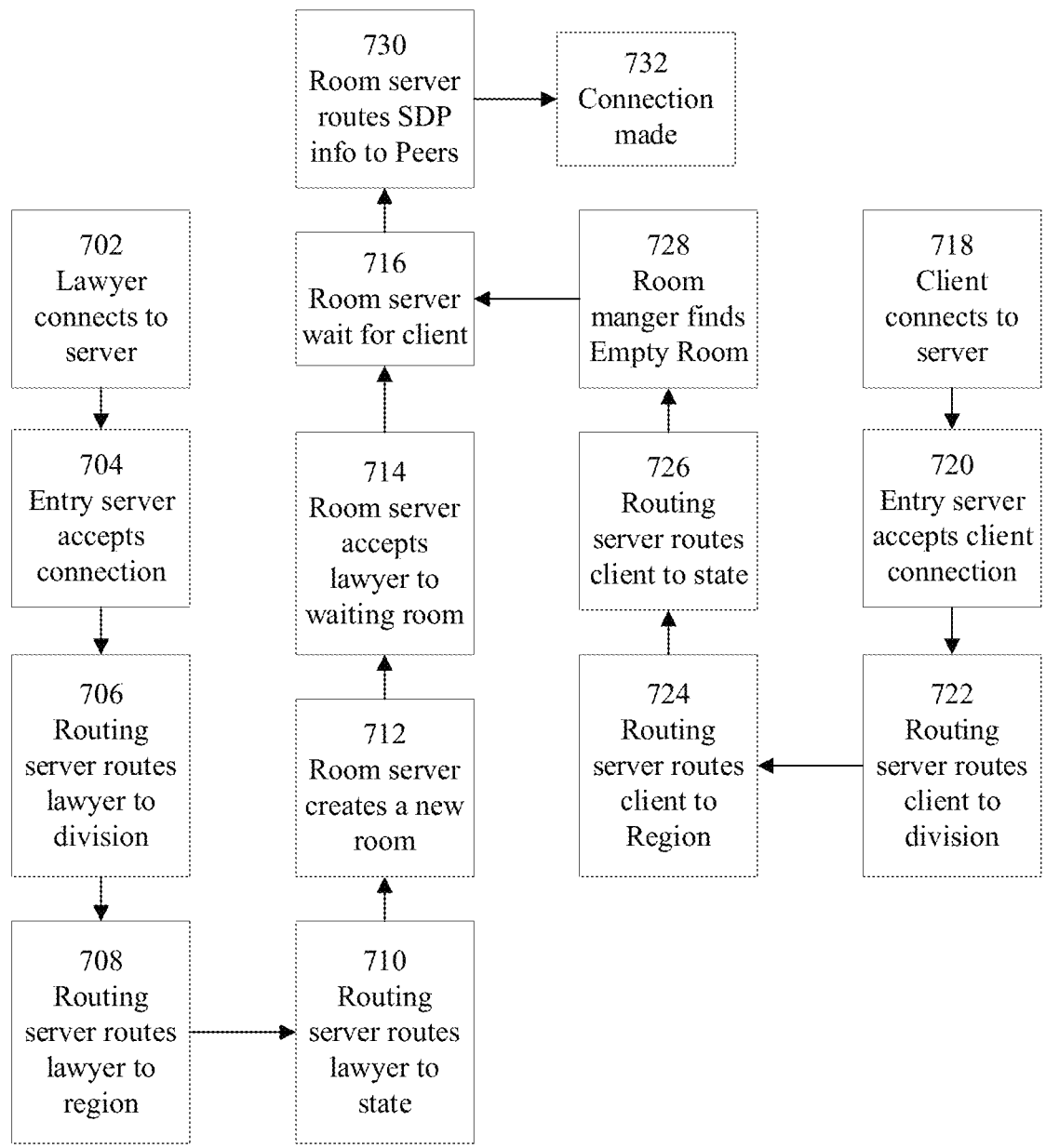
FIG. 7 illustrates a process for delivering legal assistance in real-time, according to an embodiment of the disclosure herein.

FIG. 7 illustrates a process for delivering legal assistance in real-time, according to embodiments of the present invention.

At 702, the legal services assistance system may allow the lawyer to connect to the server for accessing services.

At 704, the server which may be an entry server waits for a client to make a connection request. If everything goes well, the entry server accepts the connection.

At 706, Upon acceptance, the server gets a new socket bound to a different port and routing server routes Lawyer to a division.

At 708, the routing server routes Lawyer to a nearby region or a region selected by the client.

At 710, the routing server routes the Lawyer to state.

At 712, the room server may create a new room for waiting till the lawyer is connected with client.

At 714, the room server accepts lawyer in the waiting room.

At 716, further the room server waits for the client in the waiting room.

At 718, the legal services delivery system 100 may be configured to allow a plurality of clients to login the portal or website or the application when the get pulled over and need access to legal assistance immediately. The Clients may provide input and connect to the server by initiating a connection request.

At 720, the entry server may be adapted to accept client connection.

At 722, the routine server routes client to division, once the clients are routed the process move to step 722.

At 724, the routing server routes client to a region.

At 726, routing server routes client to state and move to step,

At 728, room manager may find empty room, and direct to the room server that may be configured to wait for the client established at 716.

At 730, room server routes session description protocol (SDP) information to peers.

At 732, the connection is established between the client and the lawyer for audio or video for legal assistance.

Figure 8:
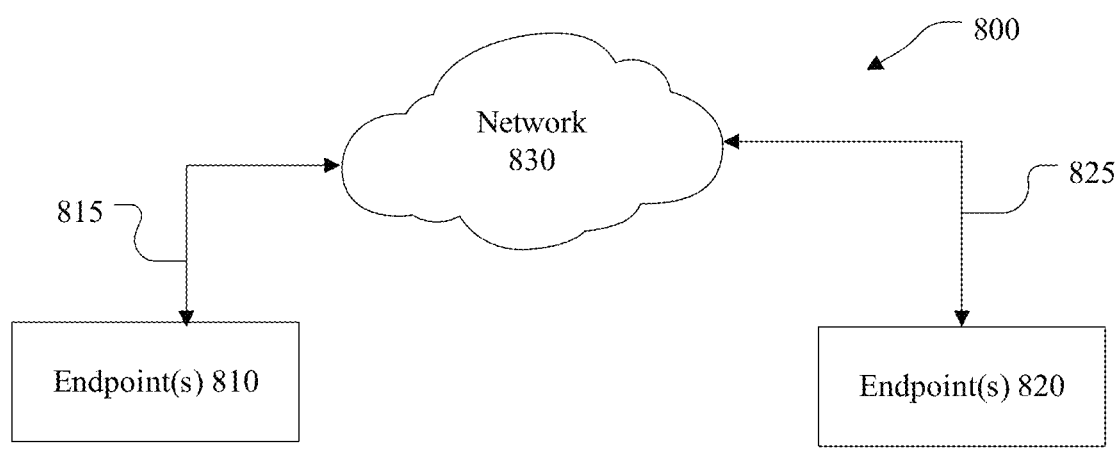
FIG. 8 is a simplified block diagram illustrative of a communication system that can be utilized to facilitate communication between endpoint(s) through a communication network, according to particular embodiments of the disclosure.

FIG. 8 is a simplified block diagram illustrative of a communication system 800 that can be utilized to facilitate communication between endpoint(s) 810 and endpoint(s) 820 through a communication network 830, according to particular embodiments of the disclosure. When referencing communication, for example, showing arrows or "clouds," or "networks," any of such communication may occur in the manner described below or other manners. Likewise, the endpoints may generally correspond to any two particular components described (or combination of component) with another component or combination of components.

As used herein, "endpoint" may generally refer to any object, device, software, or any combination of the preceding that is generally operable to communicate with and/or send information to another endpoint. In certain configurations, the endpoint(s) may represent a user, which in turn may refer to a user profile representing a person. The user profile may comprise, for example, a string of characters, a username, a passcode, other user information, or any combination of the preceding. Additionally, the endpoint(s) may represent a device that comprises any hardware, software, firmware, or combination thereof operable to communicate through the communication network 830 and carry out some (or none) of the logic described herein. As a non-limiting example, in particular configurations, endpoints 810 may correspond to servers executing the functions described with reference to FIGS. 1 through 7. The endpoint 820 may generally correspond to a cloud-based computer administering one or more endpoints 810. While the endpoint is described as communicating with another cloud-based endpoint 820, in other configurations, the endpoint 810 may not correspond to another cloud-based endpoint 820.

Examples of an endpoint(s) include, but are not necessarily limited to those devices describe herein, a computer or computers (including servers, applications servers, enterprise servers, desktop computers, laptops, netbooks, tablet computers (e.g., IPAD), a switch, mobile phones (e.g., including IPHONE and Android-based phones), networked televisions, networked watches, networked glasses, networked disc players, components in a cloud-computing network, or any other device or component of such device suitable for communicating information to and from the communication network 830. Endpoints may support Internet Protocol (IP) or other suitable communication protocols. In particular configurations, endpoints may additionally include a medium access control (MAC) and a physical layer (PHY) interface that conforms to IEEE 801.11. If the endpoint is a device, the device may have a device identifier such as the MAC address and may have a device profile that describes the device. In certain configurations, where the endpoint represents a device, such device may have a variety of applications or "apps" that can selectively communicate with certain other endpoints upon being activated.

The communication network 830 and links 815, 825 to the communication network 630 may include, but is not limited to, a public or private data network; a local area network (LAN); a metropolitan area network (MAN); a wide area network (WAN); a wireline or wireless network (WIFI, GSM, CDMA, LTE, WIMAX, BLUETOOTH or the like); a local, regional, or global communication network; portions of a cloud-computing network; a communication bus for components in a system; an optical network; a satellite network; an enterprise intranet; other suitable communication links; or any combination of the preceding. Yet additional methods of communications will become apparent to one of ordinary skill in the art after having read this specification. In particular configuration, information communicated between one endpoint, and another may be communicated through a heterogeneous path using different types of communications. Additionally, certain information may travel from one endpoint to one or more intermediate endpoint before being relayed to a final endpoint. During such routing, select portions of the information may not be further routed. Additionally, an intermediate endpoint may add additional information.

Although endpoint generally appears as being in a single location, the endpoint(s) may be geographically dispersed, for example, in cloud computing scenarios. In such cloud computing scenarios, and endpoint may shift hardware during back up. As used in this document, "each" may refer to each member of a set or each member of a subset of a set.

When the endpoints(s) 810, 820 communicate with one another, any of a variety of security schemes scheme may be utilized. As an example, in particular embodiments, endpoint(s) 820 may represent a client and endpoint(s) 820 may represent a server in client-server architecture. The server and/or servers may host a website. And, the website may have a registration process whereby the user establishes a username and password to authenticate or log in to the website. The website may additionally utilize a web application for any particular application or feature that may need to be served up to web site for use by the user.

A variety of embodiments disclosed herein may avail from the above-referenced communication system or other communication systems.

Figure 9:
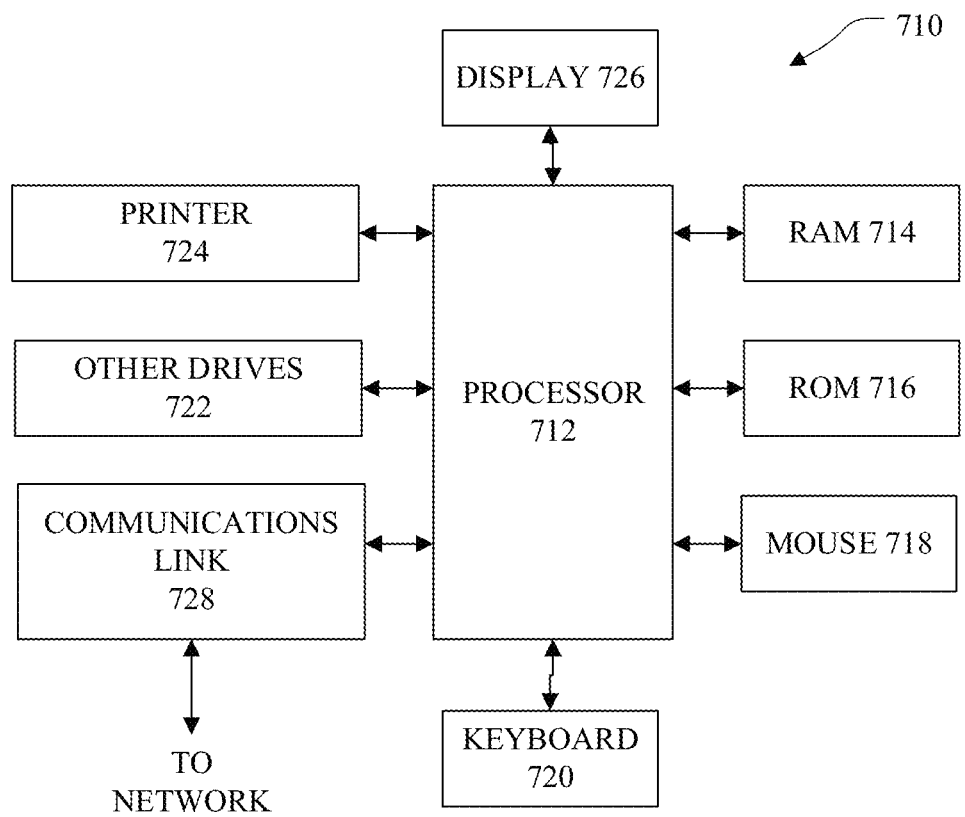
FIG. 9 is an embodiment of a general-purpose computer that may be used in connection with other embodiments of the disclosure to carry out any of the above-referenced functions and/or serve as a computing device for endpoint(s).

FIG. 9 is an embodiment of a general-purpose computer 910 that may be used in connection with other embodiments of the disclosure to carry out any of the above-referenced functions and/or serve as a computing device for endpoint(s) 810 and/or endpoint(s) 820. In executing the functions described above, the computer is able to things it previously could not do. The general-purpose computer 910 may have some of the features described or use alternative features. As a non-limiting example, the general-purpose computer may be a mobile phone or tablets running iOS or Android operating system and have no need for a mouse 918. And, the keyboard 920 may be integrated with the display 926 as a "touch" screen. For purpose of brief recapitulation, non-liming examples include WI-FI, BLUETOOTH, and cellular communications. Also, the printer 924 may be wirelessly connected to the remainder of the general-purpose computer.

General purpose computer 910 may generally be adapted to execute any of the known OS2, UNIX, Mac-OS, Linux, Android iOS, and/or Windows Operating Systems or other operating systems. The general-purpose computer 910 in this embodiment includes a processor 912, random access memory (RAM) 914, a read only memory (ROM) 916, a mouse 918, a keyboard 920 and input/output devices such as a printer 924, disk drives 922, a display 926 and a communications link 928. In other embodiments, the general-purpose computer 910 may include more, less, or other component parts. Embodiments of the present disclosure may include programs that may be stored in the RAM 914, the ROM 916 or the disk drives 922 and may be executed by the processor 912 in order to carry out functions described herein. The communications link 928 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Disk drives 922 may include a variety of types of storage media such as, for example, floppy disk drives, hard disk drives, CD ROM drives, DVD ROM drives, magnetic tape drives or other suitable storage media. Although this embodiment employs a plurality of disk drives 922, a single disk drive 922 may be used without departing from the scope of the disclosure.

Although FIG. 9 provides one embodiment of a computer that may be utilized with other embodiments of the disclosure, such other embodiments may additionally utilize computers other than general purpose computers as well as general purpose computers without conventional operating systems. Additionally, embodiments of the disclosure may also employ multiple general-purpose computers 910 or other computers networked together in a computer network. The computers 910 may be servers or other types of computing devices. Most commonly, multiple general-purpose computers 910 or other computers may be networked through the Internet and/or in a client server network. Embodiments of the disclosure may also be used with a combination of separate computer networks each linked together by a private or a public network.

Several embodiments of the disclosure may include logic contained within a medium. In the embodiment of FIG. 9, the logic includes computer software executable on the general-purpose computer 910. The medium may include the RAM 914, the ROM 916, the disk drives 922, or other mediums. In other embodiments, the logic may be contained within hardware configuration or a combination of software and hardware configurations.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and description the principles of the present disclosure and its practical application, to thereby enable others skilled in the art to best utilize the present disclosure and various embodiments with various modifications as are suited to the particular use contemplated.

What is claimed is:

1. A system for an on-demand connection of a client with a legal professional, the system comprising logic stored in computer readable media such that when executed by a processor:

receives a request to connect a client with a legal professional for a particular legal event;

determines the type of legal professional corresponding to the legal event;

selects a legal professional capable of handling the particular legal event, the legal professional selected amongst multiple candidate legal professionals; and establishes, during the legal event, a real-time two-way communication between the client and the selected legal professional, the client not having previously communicated with the selected legal professional, the real-time two way communications established to receive advice concerning the legal event.

2. The system of claim 1, wherein the request is received from an application on a mobile phone that is associated with the system, the application having permissions to use audio and speaker capabilities of the mobile phone to capture at least a portion of the legal event.

3. The system of claim 2, the application also having permissions to use camera capabilities of mobile phone to capture at least a portion of the legal event.

4. The system of claim 3, wherein the logic when executed by a processor:

in establishing a real-time two-way communication between the client and the selected legal professional provides a video feed of at least portion of the legal event to the legal professional, the video feed captured by the camera capabilities of the phone.

5. The system of claim 4, wherein the logic when executed by a processor:

provides the video feed to designated contacts associated with the legal professional.

6. The system of claim 2, wherein the real-time communications allows the legal professional to also communicate with third parties concerning the particular legal event.

7. The system of claim 1, wherein the logic when executed by a processor:

receives media from the client concerning the legal event, the media captured prior to the two-way communication between selected legal professional and the client; and supplies the media to the selected legal professional.

8. The system of claim 1, wherein the media is a picture of one or more documents concerning the legal event.

9. The system of claim 1, wherein the media is a video concerning the legal event.

10. The system of claim 1, wherein the selected legal professional is a lawyer.

11. The system of claim 1, wherein the logic when executed by a processor:
automatically gathers a location of the client; and
in selecting the legal professional considers the location of the client in relation to either a licensed location of prospective legal professional or a proximity of the prospective legal professional.

12. The system of claim 11, wherein the logic when executed by a processor:
determines the location of other clients in proximity to the client,
both the client and the other clients are registered with the system, and
invites, based on such proximity, other clients registered with the system to capture media corresponding to the event.

13. The system of claim 1, wherein the logic when executed by a processor:
establishes communications with one or more designated contacts associated with the client.

14. The system of claim 1, wherein the logic when executed by a processor:
alerts one or more candidate legal professionals to establishes communications with the system prior to selecting the legal professional.

15. The system of claim 1, wherein the logic when executed by a processor:
receiving preferences of a client prior to receiving a request to connect the client with a legal professional for the particular legal event.

16. The system of claim 1, wherein multiple candidate legal professional capable of handling the particular legal event are connected to the system and waiting in a pool, the logic when executed by the processor selected legal professional selected from the pool of multiple candidate legal professionals.

* * * * *